July 25, 1967 T. E. REEVES 3,332,156

NUMERICAL BASE CONVERSION DEVICE

Filed Oct. 21, 1965 4 Sheets-Sheet 1

INVENTOR
THOMAS E. REEVES

BY J. M. Carson, Jr.
ATTORNEY

July 25, 1967 T. E. REEVES 3,332,156

NUMERICAL BASE CONVERSION DEVICE

Filed Oct. 21, 1965 4 Sheets-Sheet 2

INVENTOR
THOMAS E. REEVES

BY J. M. Carson, Jr.
ATTORNEY

July 25, 1967 T. E. REEVES 3,332,156

NUMERICAL BASE CONVERSION DEVICE

Filed Oct. 21, 1965 4 Sheets-Sheet 3

INVENTOR
THOMAS E. REEVES

BY J. M. Carson, Jr.
ATTORNEY

July 25, 1967 T. E. REEVES 3,332,156

NUMERICAL BASE CONVERSION DEVICE

Filed Oct. 21, 1965

4 Sheets-Sheet 4

INVENTOR
THOMAS E. REEVES

BY J. M. Carson, Jr.
ATTORNEY

1

3,332,156

NUMERICAL BASE CONVERSION DEVICE

Thomas E. Reeves, 224 Janice Drive, Athens, Ga. 30601

Filed Oct. 21, 1965, Ser. No. 499,783
6 Claims. (Cl. 35—30)

Figure 1:
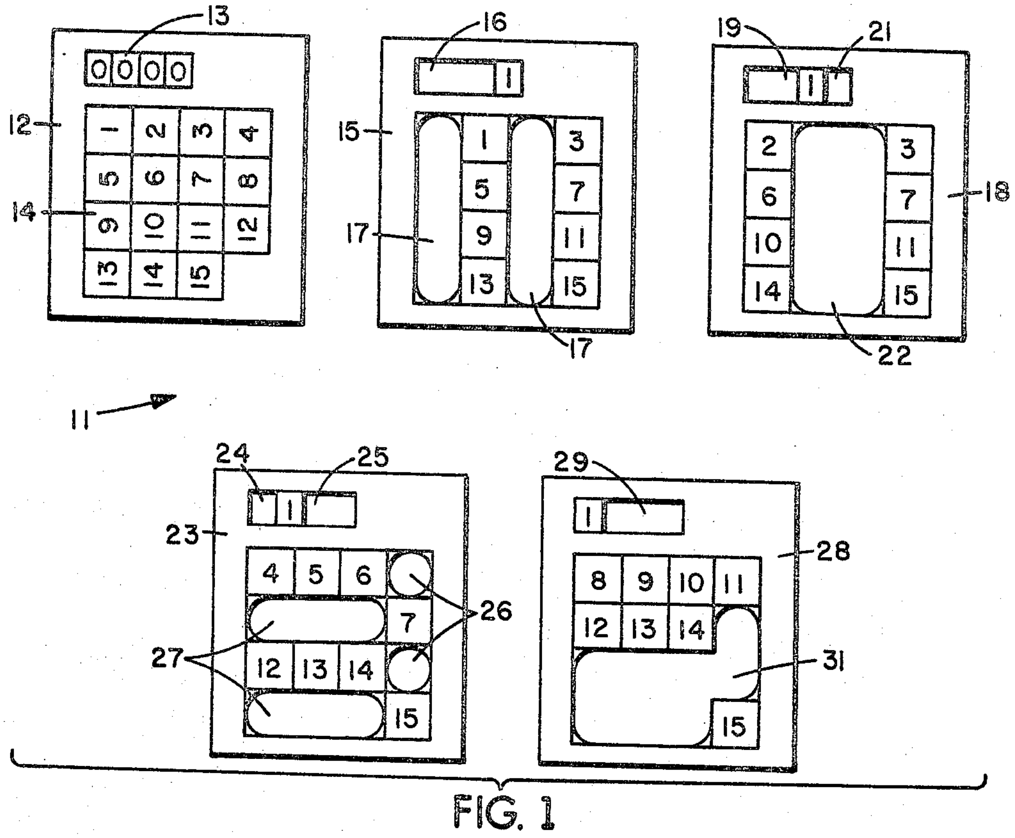

This invention relates generally to a device for converting numbers in one base system to corresponding numbers in another base system, and more particularly to a device for converting numbers from the decimal system to the binary system and from the binary system to the decimal system. The device according to the present invention may also be used for the purposes of instruction and amusement.

The decimal system of computation in general usage, having the base "ten," is no longer wholly adequate for modern purposes. Accordingly, instruction in systems of computation having other numerical bases, particularly the binary system having the base "two," is becoming increasingly important in the teaching of mathematics; such instruction including the conversion of numbers from system to system having different numerical bases. The binary system, for example, is preferred in modern computer operations since, without going into the details thereof, it is well known that electronic computers based on the binary system are simpler and operate at vastly higher speeds than those based on the decimal system of computation.

The calculations involved in converting a number in one base system to a corresponding number in another base system, while well known, may be cumbersome and time consuming. One heretofore proposed mechanical device designed to overcome this problem is disclosed in U.S. Patent No. 3,055,121 granted on September 25, 1962, to William A. Neal. A device such as that shown in U.S. Patent No. 3,055,121 may not, however, due to its complexity and cost, be readily available to all who may have need of a device adapted to readily perform decimal-binary number conversions.

Accordingly, an object of the present invention is the provision of an inexpensive and simple device for converting a number in one base system to a corresponding number in another base system.

Another object of the instant invention is the provision of a simple and inexpensive amusement device.

A further object of the present invention is the provision of a simple and inexpensive device for converting a number in the decimal system to a corresponding number in the binary system and for converting a number in the binary system to a corresponding number in the decimal system.

Still another object of the instant invention is the provision of a simple and inexpensive device based upon mathematical principles on which games amusing to the participants therein, and on which conversions of numbers in one base system to corresponding numbers in another base system, may be predicated.

According to the present invention, the foregoing and other objects are attained by providing a device comprising a plurality of sheets of material identical in shape and size and adapted to be congruently stacked. The device includes a base sheet provided at a desired location with a binary register area composed of a plurality of linearly disposed adjoining spaces; each succeeding one of which, reading from right to left, may be defined as binary position $2^0$, binary position $2^1$, binary position $2^2$, etc., respectively, and each one of which carries a single zero. The base sheet is further provided at another desired location with a series of decimal numbers arranged in a fixed pattern, beginning with the number "1" and progressing upwardly to a preselected maximum number

2 which, when converted into binary notation, may be expressed as a series of ones, or of ones and zeros, equal in number to the number of binary positions or zero carrying spaces provided on the base sheet. The device further includes a plurality of overlay sheets made of opaque or equivalent material each of which is provided with openings or transparent areas or sections through which selected portions of the base sheet may be viewed when an overlay sheet is congruently positioned thereupon. More specifically, each of the overlay sheets carries a numeral "1" in a position to overlie and obscure a different one of the base sheet binary position spaces and the zero carried thereon when the overlay sheet is congruently positioned upon the base sheet; the remaining binary position spaces and the zeros carried thereon being visible through the overlay sheet, as well as all of the decimal numbers carried by the base sheet which, when converted into binary notation, would have a "1" in the binary position corresponding to the obscured base sheet binary position. Each of the overlay sheets, when congruently positioned upon the base sheet, obscures all of the base sheet except those portions thereof set forth hereinbefore. Moreover, each of the overlay sheets, in a portion thereof adapted to obscure the base sheet when the overlay sheet is congruently positioned thereupon, carries indicia corelative to each of the decimal numbers carried by the base sheet visible through the overlay sheet, generally consisting of a repetition of these base sheet decimal numbers. By proper selection of one or more of the overlay sheets for simultaneous congruent positioning upon the base sheet, corresponding decimal and binary numbers may be determined by inspection. The device may also be used to play numerical "guessing" games without modification, and to play variations of such numerical "guessing" games with slight modification.

Figure 2A:
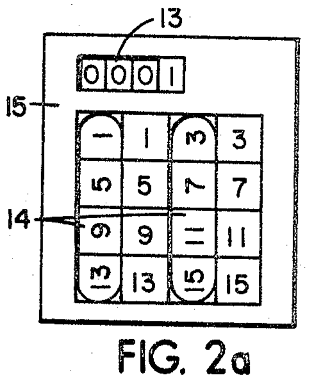
Figure 2B:
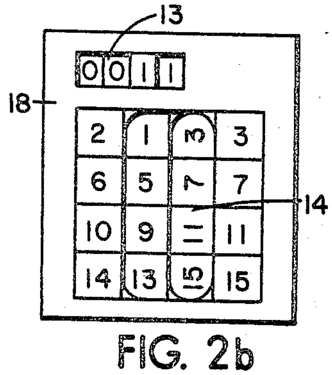
Figure 2C:
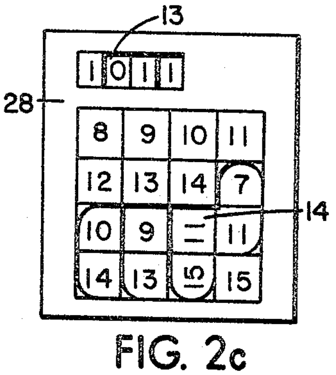
Figure 3:
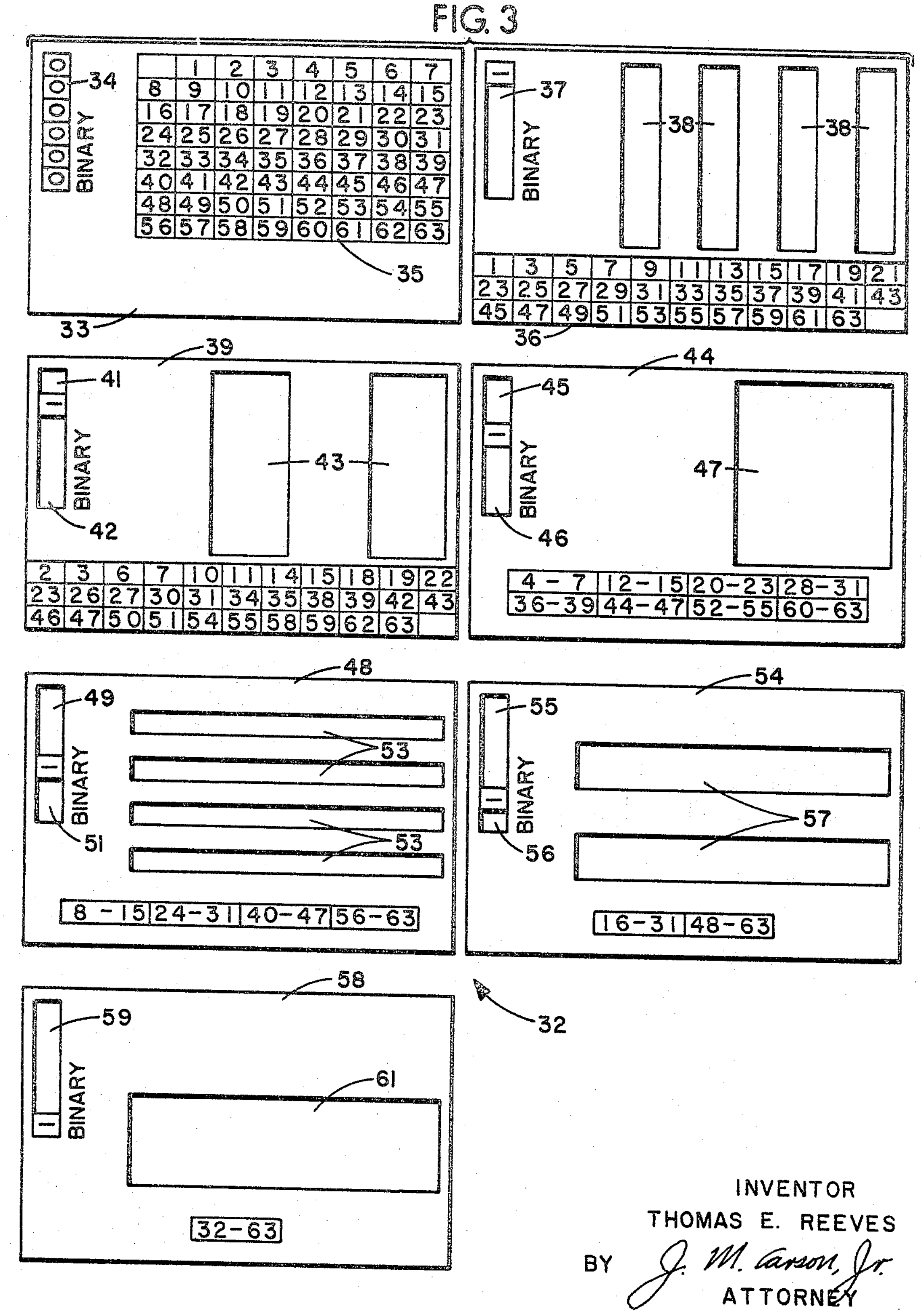
Figure 4A:
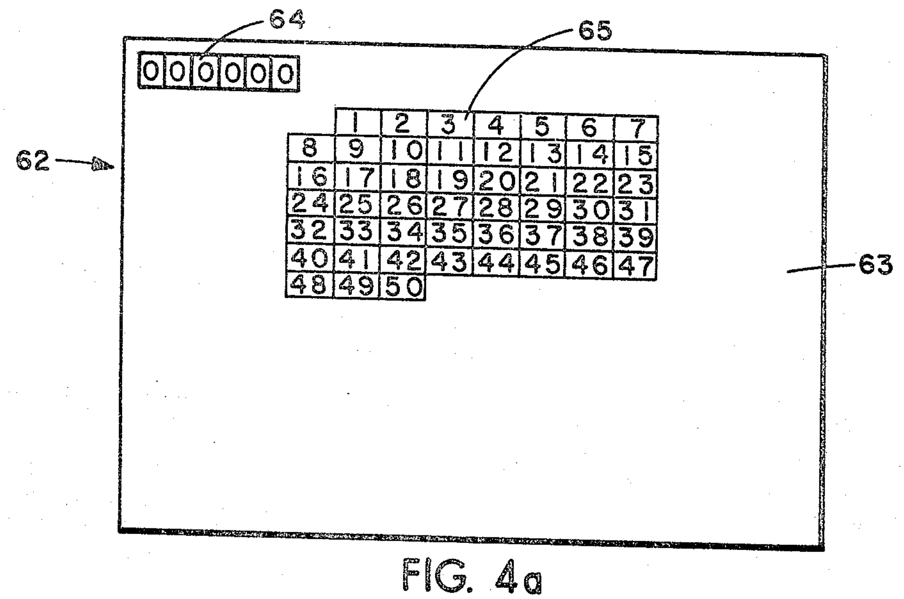
Figure 4B:
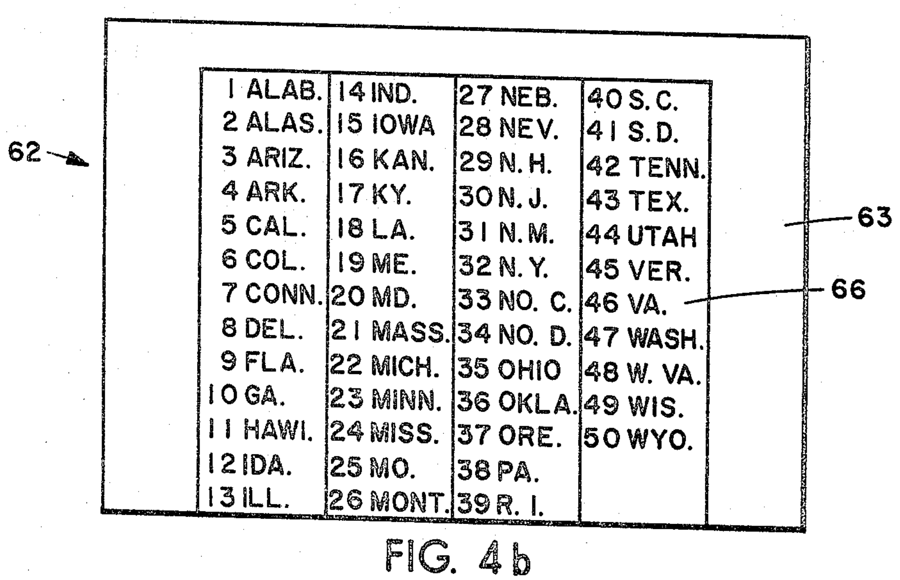
Figure 5:
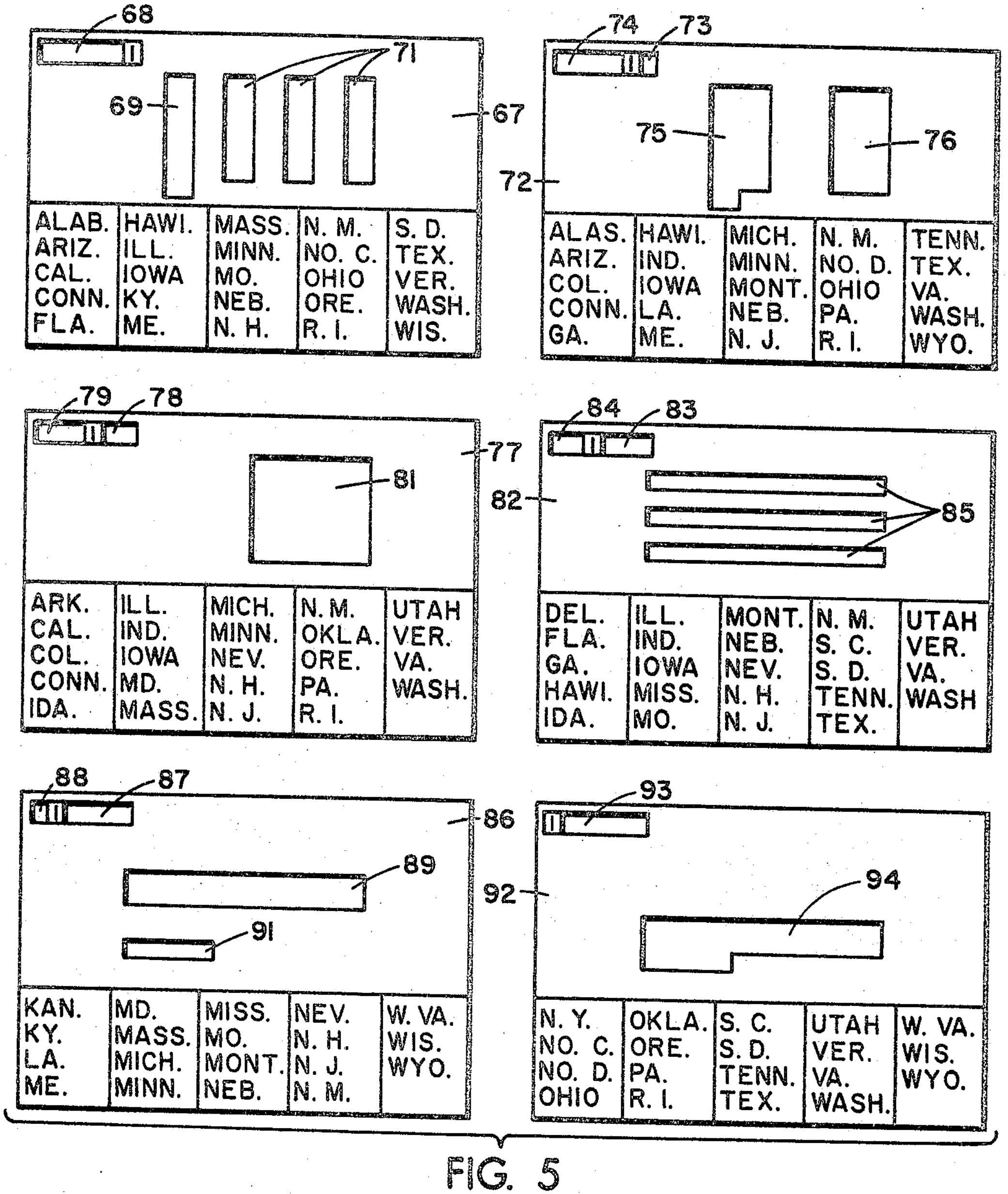

A more complete appreciation of the invention and many of the attendant advantages thereof will be readily apparent as the same becomes better understood by reference to the following detailed description when considered in connection with the accompanying drawings wherein:

FIG. 1 is a plan view of one embodiment of the device according to the present invention, having a base sheet and four overlay sheets;

FIGS. 2*a*–2*c* illustrate the sequence of events in utilizing the device of FIG. 1 to solve a specific problem;

FIG. 3 is a plan view of another embodiment of the device according to the instant invention, having a base sheet and six overlay sheets;

FIGS. 4*a* and 4*b* are plan views of the obverse and reverse sides, respectively, of the base sheet of still another embodiment of the device according to the present invention; and, FIG. 5 is a plan view, on a reduced scale, of six overlay sheets used with the base sheet of FIGS. 4*a* and 4*b*.

Referring now more particularly to the drawings, wherein like reference numerals designate the same or identical parts throughout the several views, and more specifically to FIG. 1, there is shown a decimal-binary number conversion device, generally designated by the reference numeral 11. Device 11 includes a base sheet 12 formed of thin, opaque, sheet material which is provided at a desired location with a binary register area 13 composed of a plurality of four linearly disposed adjoining spaces; each succeeding one of which, reading from right to left, may be defined as binary posiiton $2^0$, binary position $2^1$, binary position $2^2$, and binary position $2^3$, and each one of which carries a single zero. Base sheet 12 is provided at another desired location 14 with a series of decimal numbers arranged in a fixed pattern, beginning with the number "1" and progressing upwardly to the maximum number "15";

the decimal number "15" being the highest that, when converted into binary notation, may be set forth in four binary positions. The following table may facilitate consideration of device 11:

| Decimal number: | Corresponding binary number |
|---|---|
| 1 | 1 |
| 2 | 10 |
| 3 | 11 |
| 4 | 100 |
| 5 | 101 |
| 6 | 110 |
| 7 | 111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |

and the discussion set forth in the specification of U.S. Patent No. 3,006,082 granted on Oct. 31, 1961, to Miles A. Libbey may be of further assistance in the understanding of the relationship of corresponding numbers in these different numerical base systems of computation.

Device 11 further includes a plurality of overlay sheets equal in number to the number of binary position spaces in the binary register area 13 of base sheet 12. Each of the four overlay sheets of device 11 is formed of a thin sheet of material corresponding in size and shape to base sheet 12 and which is provided with openings or perforations, as shown in the drawings, or transparent areas or sections through which selected portions of base sheet 12 may be viewed when the overlay sheet is congruently positioned upon the base sheet 12. If the overlay sheets are perforated, as shown in the drawings, they may be formed of an opaque material; but if overlay sheets without openings are preferred, a material such as a clear acrylic plastic, for example, may be used, which may be provided with an opaque coating, such as a light, flat paint, in those areas thereof intended to obscure base sheet 12 when an overlay sheet is congruently positioned thereon.

More specifically, device 11 includes a first overlay sheet 15 which carries a numeral "1" in a position to overlie and obscure base sheet 12 binary position $2^0$ when overlay sheet 15 is congruently positioned upon base sheet 12, and which is provided with an opening 16 formed therethrough to simultaneously expose binary positions $2^1$ through $2^3$ of base sheet 12, and the zero carried by each. Overlay sheet 15 further includes openings 17 formed therethrough to simultaneously expose all of the decimal numbers carried at 14 by base sheet 12 which, when converted into corresponding numbers in binary notation, would have a "1" in binary position $2^0$; that is, all odd decimal numbers from "1" to "15," as made apparent by the foregoing table. It will be noted that overlay sheet 15 also carries the same decimal numbers carried by base sheet 12 that are visible through the openings 17 of overlay sheet 15 when overlay sheet 15 is congruently positioned upon base sheet 12, and that these decimal numbers carried by overlay sheet 15 may aptly be termed "indicia carried by the overlay sheet corelative with each of the decimal numbers carried by the base sheet visible through the overlay sheet when the overlay sheet is congruently positioned upon the base sheet." Inasmuch as the decimal numbers carried by the overlay sheet 15 overlie and obscure certain of the decimal numbers carried at 14 by the base sheet 12, while the remaining decimal numbers carried at 14 by the base sheet 12 are visible through the openings 17 of overlay sheet 15 in close proximity to the decimal numbers carried by the overlay sheet 15 when the overlay sheet 15 is congruently positioned upon base sheet 12, the decimal numbers carried at 14 by the base sheet 12 have each been rotated 90° from the vertical solely for the purpose of contrast. In practice, such a contrast may also be provided by making the decimal numbers carried by base sheet 12 and overlay sheet 15 of different colors, as well as by other expedients.

Device 11 also includes a second overlay sheet 18 which carries a numeral "1" in a position to overlie and obscure base sheet 12 binary position $2^1$ when overlay sheet 18 is congruently positioned upon base sheet 12, and which is further provided with openings 19 and 21 formed therethrough to simultaneously expose binary positions $2^0$, $2^2$, and $2^3$ of base sheet 12 and the zero carried by each, as well as an opening 22 formed therethrough to simultaneously expose all of the decimal numbers carried at 14 by base sheet 12 which, when converted into corresponding numbers in binary notation, would have a "1" in binary position $2^1$. Overlay sheet 18 likewise carries the same decimal numbers as those carried by base sheet 12 that are visible through the opening 22 of overlay sheet 18 when overlay sheet 18 is congruently positioned upon base sheet 12.

Third and fourth overlay sheets 23 and 28, respectively, are also included by device 11. Overlay sheet 23 carries a numeral "1" in a position to overlie and obscure base sheet 12 binary position $2^2$ when overlay sheet 23 is congruently positioned upon base sheet 12, and is provided with openings 24 and 25 formed therethrough to simultaneously expose binary positions $2^0$, $2^1$, and $2^3$ of base sheet 12 and the zero carried by each; while overlay sheet 28 carries a numeral "1" in a position to overlie and obscure base sheet 12 binary position $2^3$ when overlay sheet 28 is congruently positioned upon base sheet 12, and is provided with an opening 29 formed therethrough to simultaneously expose binary positions $2^0$ through $2^2$ and the zero carried by each. Overlay sheet 23 is further provided with openings 26 and 27 formed therethrough to expose all of the decimal numbers carried at 14 by base sheet 12 which, when converted into corresponding numbers in binary notation, would have a "1" in binary position $2^2$, when overlay sheet 23 is congruently positioned upon base sheet 12; and overlay sheet 28 is further provided with an opening 31 formed therethrough to expose all of the decimal numbers carried at 14 by base sheet 12 which, when converted into corresponding numbers in binary notation, would have a "1" in binary position $2^3$, when overlay sheet 28 is congruently positioned upon base sheet 12. Overlay sheet 23 also carries the same decimal numbers as those carried by base sheet 12 that are visible through the openings 26 and 27 of overlay sheet 23 when overlay sheet 23 is congruently positioned upon base sheet 12, and overlay sheet 28 further carries the same decimal numbers as those carried by base sheet 12 that are visible through the opening 31 of overlay sheet 28 when overlay sheet 28 is congruently positioned upon base sheet 12.

It will be noted that the combination of decimal numbers carried at 14 by the base sheet 12 that are visible through each of the overlay sheets 15, 18, 23, and 28 when each of these overlay sheets is individually congruently positioned upon base sheet 12 are all different, and that consequently each of these overlay sheets carries a different combination of decimal numbers. Further, the decimal numbers carried by each of the overlay sheets 18, 23, and 28 may be aptly termed "indicia carried by the overlay sheet corelative with each of the decimal numbers carried by the base sheet visible through the overlay sheet when the overlay sheet is congruently positioned upon the base sheet."

From the foregoing, it will now be obvious that the overlay sheets included in a decimal-binary number conversion device such as the device 11 are constructed in accordance with the following simple requirements: (a) the number of overlay sheets shall be equal in number to the number of binary positions in the binary register area of the base sheet of the device, (b) each overlay sheet shall carry a numeral "1" in a position to overlie and obscure a different one of the binary positions in the base sheet binary register area when the overlay sheet is congruently positioned upon the base sheet, (c) each overlay sheet shall be so constructed that the remaining binary positions in the base sheet binary register area will be visible therethrough when the overlay sheet is congruently positioned upon the base sheet, (d) each overlay sheet shall further be so constructed that there will be visible therethrough when the overlay sheet is congruently positioned upon the base sheet those decimal numbers carried by the base sheet which, when converted into corresponding numbers in binary notation, will have a numeral "1" in the same binary position as that of the base sheet binary register area obscured when the overlay sheet is congruently positioned upon the base sheet, and (e) each overlay sheet shall carry indicia corelative with each of the decimal numbers carried by the base sheet visible through the overlay sheet when the overlay sheet is congruently positioned upon the base sheet.

The use of the device 11 to solve a specific problem is sequentially illustrated in FIGS. 2*a*–2*c* of the drawings. The problem may be, for example, the determination of the decimal number corresponding to binary number "1011." It will be noted that this binary number has a numeral "1" in binary positions $2^0$, $2^1$, and $2^3$. Accordingly, overlay sheets 15, 18, and 28, which collectively carry numerals "1" in positions to overlie and obscure base sheet binary positions $2^0$, $2^1$, and $2^3$, are selected for use with base sheet 12 in obtaining the solution of this problem, and the overlay sheet 23 is put aside as being of no concern therein. Overlay sheet 15 is then congruently positioned upon base sheet 12, as shown in FIG. 2*a*; overlay sheet 18 is next congruently positioned upon the stacked base sheet 12 and overlay sheet 15; and overlay sheet 28 is finally congruently positioned upon stacked base sheet 12, overlay sheet 15, and overlay sheet 18; as shown, respectively, in FIGS. 2*b* and 2*c* of the the drawings. The exact order in which overlay sheets 15, 18, and 28 are stacked upon base sheet 12 is, however, of no consequence, and any other sequence may be followed in positioning these overlay sheets upon base sheet 12. Referring now more specifically to FIG. 2*c* of the drawings, it will be seen that the zero carried by binary position $2^2$ of the binary register area of base sheet 12 is visible through all of the overlay sheets 15, 18, and 28 and that the numerals "1" carried by each of these overlay sheets in a position to obscure a base sheet 12 binary position are also all visible; the whole forming or registering the binary number "1011." The stacked base sheet and overlay sheet arrangement shown in FIG. 2*c* is now inspected to find the lowest decimal number carried at 14 by the base sheet 12 visible through all of the overlay sheets 15, 18, and 28, and this is found to be the decimal number "11," which is the decimal number corresponding to binary number "1011."

FIGS. 2*a*–2*c* also illustrate the converse of the binary-decimal number conversion described hereinbefore. Suppose that the problem to be solved concerns the conversion of the decimal number "11" into the corresponding number in binary notation. Each of the overlay sheets 15, 18, 23, and 28 are first inspected to find which carry the decimal number "11," and it will be seen that this decimal number is carried by all except overlay sheet 23, which is put aside as being of no concern in the solution of this problem. Overlay sheets 15, 18, and 28, each of which carry the decimal number "11," are then simultaneously stacked congruently upon the base sheet 12 in the sequence illustrated, or in any other sequence. It will also be noted that the decimal number "11" with which this problem is concerned also appears as the lowest decimal number carried by base sheet 12 visible through overlay sheets 15, 18, and 28, as shown in FIG. 2*c*. The numerals "1" carried by each of these overlay sheets in a position to obscure one of the zeros carried by a base sheet 12 binary position, taken with the unobscured zero carried by the remaining base sheet 12 binary position, form or register the binary number "1011," which corresponds to decimal number "11."

Any other binary-decimal number conversion within the scope of the device 11 may also be performed in a manner corresponding to those set forth hereinbefore.

A device such as the device 11 may also be used in playing a numerical "guessing" game. The possessor of the device 11 may, in playing such a game, ask another person to mentally select a decimal number ranging from "1" to "15," which are all of the decimal numbers within the scope of device 11, and refrain from revealing this mentally selected decimal number to the possessor of the device 11, or operator of the game. The device 11 in its entirety, or the entire device 11 except for the base sheet 12, as preferred, is then handed to the person who has mentally selected such a decimal number, who is then instructed to return to the operator all of the sheets thereof upon which the mentally selected number appears; which will, of course, include base sheet 12 if this has been handed to the person mentally selecting the decimal number to be "guessed" by the operator. This having been done, the operator congruently stacks all of the overlay sheets returned to him upon the base sheet 12, inspects the stacked base sheet and overlay sheet arrangement to find the lowest decimal number carried at 14 by base sheet 12 visible through the overlay sheets, and then announces that this decimal number is that mentally selected. This "mental feat" may be accomplished by virtue of the fact that the lowest decimal number carried in common by any combination of the overlay sheets 15, 18, 23, and 28 is always the same as the lowest decimal number carried at 14 by base sheet 12 visible through the particular combination of overlay sheets when they are simultaneously congruently positioned upon base sheet 12.

If a device such as the device 11 is desired solely for the purpose of playing such a "guessing" game; the binary register area 13 of base sheet 12, and the numeral "1" carried by each of the overlay sheets 15, 18, 23, and 28 in a position to overlie and obscure one of the binary positions of base sheet 12 binary register area 13 when the overlay sheet is congruently positioned upon the base sheet 12, as well as the openings formed through each of the overlay sheets to simultaneously expose the remaining binary positions of base sheet 12 binary register area 13; may be eliminated as unnecessary.

The scope of the decimal-binary conversion device according to the instant invention may be enlarged to the maximum practical extent, being limited only by the physical difficulties inherent in constructing and handling too many overlay sheets large in area along with an equally large base sheet. One enlarged embodiment of the device according to the present invention is illustrated in FIG. 3 of the drawings by way of exemplification. The device, shown in FIG. 3 generally designated by the reference numeral 32, includes a base sheet 33 similar in construction to the base sheet 12 of device 11, and which is provided at location 34 with a linearly disposed series of binary positions each carrying a zero which, reading from top to bottom inasmuch as this series of binary positions has been rotated 90° from the horizontal to conserve space, may be defined as binary positions $2^0$ through $2^5$. Base sheet 33 of device 32 is also provided at another desired location 35 with a series of decimal numbers arranged in a fixed pattern, beginning with the decimal number "1" and progressing upwardly to the maximum decimal number "63," which is the highest that, when converted into the corresponding binary number in binary notation, may be set forth in six binary positions.

Device 32 further includes six overlay sheets 36, 39, 44, 48, 54, and 58 similar in construction to the overlay sheets 15, 18, 23, and 28 of device 11. Overlay sheet 36 carries a numeral "1" in a position to overlie and obscure base sheet 33 binary position $2^0$ when overlay sheet 36 is congruently positioned upon base sheet 33, and overlay sheets 39, 44, 48, 54, and 58 each carry a numeral "1" in a position to similarly overlie and obscure, respectively, base sheet 33 binary positions $2^1$, $2^2$, $2^3$, $2^4$, and $2^5$. Overlay sheet 36 is also provided with an opening 37 formed therethrough to expose the base sheet 33 binary positions not overlain and obscured by the numeral "1" carried by overlay sheet 36 when it is congruently positioned upon base sheet 33, namely, base sheet 33 binary positions $2^1$ through $2^5$; and overlay sheet 39 openings 41 and 42, overlay sheet 44 openings 45 and 46, overlay sheet 48 openings 49 and 51, overlay sheet 54 openings 55 and 56, and overlay sheet 58 opening 59, are provided for similar purposes. Overlay sheet 36 is also provided with openings 38 formed therethrough to expose, when overlay sheet 36 is congruently positioned upon base sheet 33, all of the decimal numbers carried at 35 by base sheet 33 which, when converted into corresponding numbers in binary notation, would have a numeral "1" in binary position $2^0$; and overlay sheet 39 opening 43, overlay sheet 44 opening 47, overlay sheet 48 opening 53, overlay sheet 54 opening 57, and overlay sheet 58 opening 61, are likewise also provided to similarly expose, respectively, all of the decimal numbers carried at 35 by base sheet 33 which, when converted into corresponding numbers in binary notation, would have a number "1" in binary positions $2^1$, $2^2$, $2^3$, $2^4$, and $2^5$. All of the overlay sheets 36, 39, 44, 48, 54, and 58 further carry decimal number indicia corelative with each of the decimal numbers carried at 35 by base sheet 33 visible through each overlay sheet when the overlay sheet is congruently positioned upon the base sheet 33.

The device 32 is operated in a manner similar to the operation of device 11, whether for the purpose of making number conversions or the playing of a numerical "guessing" game, and any other explanation of the operation of device 32 herein is not considered necessary.

Another device, generally designated by the reference numeral 62, but modified for the playing of a variation of the "guessing" game described hereinbefore, is shown in FIGS. *4a*, *4b*, and 5 of the drawings. Device 62 includes a base sheet 63 similiar in construction to base sheet 33 of device 32, and six overlay sheets 67, 72, 77, 82, 86, and 92 similar in construction to the six overlay sheets 36, 39, 44, 48, 54, and 58 of device 32. Base sheet 63 and overlay sheets 67, 72, 77, 82, 86, and 92 are also all similar in size and shape. Base sheet 63 is provided at a desired location 64 with a linearly disposed series of binary positions each carrying a zero which, reading from right to left, may be defined as binary positions $2^0$ through $2^5$. Base sheet 63 of device 62 is also provided at another desired location 65 with a series of decimal numbers arranged in a fixed pattern, beginning with the decimal number "1" and progressing upwardly to the maximum decimal number "50"; the decimal number pattern carried by base sheet 63, insofar as it extends, being identical to the decimal number pattern carried by the base sheet 33 of device 32. Base sheet 63 is further provided, on the reverse side thereof, with a list of the decimal numbers appearing in the pattern at 65 on the obverse side thereof; each of which is keyed to a different symbol, such as the abbreviation of the name of one of the fifty States of the United States, as illustrated. The significance of the decimal number-symbol key, referred to by the reference numeral 66, will be made readily apparent hereinafter.

Overlay sheet 67 carries a numeral "1" in a position to overlie and obscure base sheet binary position $2^0$ when overlay sheet 67 is congruently positioned upon base sheet 63, and overlay sheets 72, 77, 82, 86, and 92 each carry a numeral "1" in a position to similarly overlie and obscure, respectively, base sheet 63 binary positions $2^1$, $2^2$, $2^3$, $2^4$, and $2^5$. Overlay sheet 67 is also provided with an opening 68 formed therethrough to expose the base sheet 63 binary positions not overlain and obscured by the numeral "1" carried by the overlay sheet 67 when it is congruently positioned upon base sheet 63, namely, base sheet 63 binary positions $2^1$ through $2^5$; and overlay sheet 72 openings 73 and 74, overlay sheet 77 openings 78 and 79, overlay sheet 82 openings 83 and 84, overlay sheet 86 openings 87 and 88, and overlay sheet 92 opening 93, are provided for similar purposes. Overlay sheet 67 is also provided with openings 69 and 71 formed therethrough to expose, when overlay sheet 67 is congruently positioned upon base sheet 63, all of the decimal numbers carried at 65 by base sheet 63 which, when converted into corresponding numbers in binary notation, would have a numeral "1" in binary position $2^0$; and overlay sheet 72 openings 75 and 76, overlay sheet 77 opening 81, overlay sheet 82 opening 85, overlay sheet 86 openings 89 and 91, and overlay sheet 92 opening 94, are likewise also provided to similarly expose, respectively, all of the decimal numbers carried at 65 by base sheet 63 which, when converted into corresponding numbers in binary notation, would have a numeral "1" in binary positions $2^1$, $2^2$, $2^3$, $2^4$, and $2^5$. All of the overlay sheets 67, 72, 77, 82, 86, and 92 further carry indicia corelative with each of the decimal numbers carried at 65 by base sheet 63 visible through each overlay sheet when the overlay sheet is congruently positioned upon the base sheet 63; however, such indicia, rather than being mere repetition of these decimal numbers, as in device 11 and device 32, is instead formed of the symbols keyed to these decimal numbers at 66 on the reverse side of base sheet 63.

In playing the "guessing" game for which the device 62 is designed, the operator, to use the symbols set forth in FIGS. *4b* and 5 of the drawings, would ask another person to mentally select one of the fifty States of the United States, and to withhold knowledge of this selection from the operator of the game. The overlay sheets 67, 72, 77, 82, 86, and 92, at least, are then handed to the person who has made this selection, and he is instructed to return to the operator all of the overlay sheets upon which his selection appears. This having been done, the operator congruently stacks all of the overlay sheets returned to him upon the obverse side of base sheet 63, inspects the stacked base sheet and overlay sheet arrangement to find the lowest decimal number carried at 65 by base sheet 63 visible through the overlay sheets, turns the base sheet 63 over to find which of the States is keyed at 66 to the particular decimal number, and then announces that this particular State is that mentally selected.

Symbols other than the names of the States of the United States may, of course, be used in lieu thereof in the construction of the device 62.

The device 62 is operated in a manner similar to the operation of devices 11 and 32 in converting binary numbers into corresponding decimal numbers. The operation of device 62 in converting a decimal number into a corresponding binary number, however, differs from the operation of devices 11 and 32 to perform such a conversion to the extent that the name of the State keyed to the decimal number to be converted into the corresponding binary number must be taken into account. By way of example, if the decimal number "27" is to be converted into the corresponding binary number, the key at 66 on the reverse side of base sheet 63 is first consulted, where it will be found that the symbol "Neb." is keyed thereto. Overlay sheets 67, 72, 82, and 86, upon each of which the symbol "Neb." appears, are then simultaneously congruently stacked upon the obverse side of base sheet 63; and the overlay sheets 77 and 92 are put aside as being of no concern in the solution of the problem. The binary number "11011" is then determined, from an inspection of the stacked base sheet and overlay sheet arrangement in the manner previously set forth with reference to device 11, to be that corresponding to decimal number "27."

It will further be obvious that if the devices 32 and 62 are desired solely for the purpose of playing "guessing" games, as described hereinbefore, the binary positions and the zeros thereof carried by the base sheets of these devices, as well as the numerals "1" and the openings of the overlay sheets positioned to overlie the base sheet binary positions as set forth, may be eliminated as unnecessary.

Obviously, many modifications and variations of the present invention are possible in the light of the foregoing teachings. It is therefore to be understood that within the scope of the appended claims the invention may be practiced otherwise than as specifically described.

What is claimed as new and desired to be secured by Letters Patent of the United States is:

1. A device of the character described comprising a plurality of sheets of material indentical in size and shape and adapted to be congruently stacked, including:

(A) a base sheet provided at a desired location with a series of decimal numbers beginning with the decimal number "1" and progressing upwardly to a preselected maximum decimal number, and (B) a plurality of overlay sheets equal in number to the number of binary positions required to set forth in binary notation the binary number corresponding to said preselected maximum decimal number, each one of said overlay sheets (a) being so constructed that there will be visible therethrough when the overlay sheet is congruently positioned upon said base sheet only those decimal numbers carried by said base sheet which, when converted into corresponding numbers in binary notation, will have a numeral "1" in a single binary position selected from a total number of binary positions equal to the number of said overlay sheets; the combination of decimal numbers carried by said sheet visible through one of said overlay sheets when said one of said overlay sheets is congruently positioned upon said base sheet differing from the combination of decimal numbers carried by said base sheet visible through any of the other of said overlay sheets when congruently positioned upon said base sheet, and (b) carrying indicia corelative with each of said decimal numbers carried by said base sheet visible therethrough when the overlay sheet is congruently positioned upon said base sheet.

2. The device according to claim 1 wherein said base sheet carries at another desired location a linearly disposed series of zeros equal in number to the number of said overlay sheets; and wherein each of said overlay sheets is further so constructed that there will be visible therethrough when the overlay sheet is congruently positioned upon said base sheet all of said base sheet zeros less one, the combination of said base sheet zeros visible through each of said overlay sheets differing, with each of said overlay sheets carrying a numeral "1" in that portion thereof obscuring a base sheet zero.

3. The device according to claim 1 wherein said indicia carried by each one of said overlay sheets is constituted by decimal numbers corresponding to said decimal numbers carried by said base sheet visible therethrough when said overlay sheet is congruently positioned upon said base sheet.

4. The device according to claim 3 wherein said base sheet carries at another desired location a linearly disposed series of zeros equal in number to the number of said overlay sheets; and wherein each of said overlay sheets is further so constructed that there will be visible therethrough when the overlay sheet is congruently positioned upon said base sheet all of said base sheet zeros less one, the combination of said base sheet zeros visible through each of said overlay sheets differing, with each of said overlay sheets carrying a numeral "1" in that portion thereof obscuring a base sheet zero.

5. The device according to claim 1 wherein said base sheet is further provided at another desired location with a series of different symbols, each of said symbols being keyed to a single one of said decimal number carried by said base sheet; and wherein said indicia carried by each one of said overlay sheets is constituted by symbols corresponding to said decimal numbers carried by said base sheet visible therethrough when the overaly sheet is congruently positioned upon said base sheet.

6. The device according to claim 5 wherein said base sheet carries at a further desired location a linearly disposed series of zeros equal in number to the number of said overlay sheets; and wherein each of said overlay sheets is further so constructed that there will be visible therethrough when the overlay sheet is congruently positioned upon said base sheet all of said base sheet zeros less one, the combination of said base sheet zeros visible through each of said overlay sheets differing, with each of said overlay sheets carrying a numeral "1" in that portion thereof obscuring a base sheet zero.

References Cited

UNITED STATES PATENTS 2,460,563 2/1949 Zelvin.
3,071,320 1/1963 Scott.

EUGENE R. CAPOZIO, *Primary Examiner.*

W. GRIEB, *Assistant Examiner.*